(12) United States Patent
Kwon et al.

(10) Patent No.: US 8,339,967 B2
(45) Date of Patent: Dec. 25, 2012

(54) METHOD AND APPARATUS FOR GENERATING DATA FRAME

(75) Inventors: Chang-yeul Kwon, Yongin-si (KR); Seong-soo Kim, Seoul (KR); Ji-sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 12/212,712

(22) Filed: Sep. 18, 2008

(65) Prior Publication Data

US 2009/0074010 A1    Mar. 19, 2009

Related U.S. Application Data

(60) Provisional application No. 60/972,233, filed on Sep. 18, 2007.

(30) Foreign Application Priority Data

Jul. 31, 2008  (KR) .................. 10-2008-0075347

(51) Int. Cl.
*H04L 12/56* (2006.01)

(52) U.S. Cl. ........ 370/242; 370/310; 370/389; 370/474; 370/476

(58) Field of Classification Search .................. None
See application file for complete search history.

(56) References Cited

U.S. PATENT DOCUMENTS

| | | | | |
|---|---|---|---|---|
| 5,319,707 A * | 6/1994 | Wasilewski et al. | .......... | 380/212 |
| 2005/0063314 A1 * | 3/2005 | Sahinoglu et al. | ............ | 370/252 |
| 2006/0262794 A1 | 11/2006 | Livet et al. | ..................... | 370/390 |
| 2006/0285526 A1 | 12/2006 | Jang et al. | ...................... | 370/338 |
| 2006/0291461 A1 * | 12/2006 | Stephens | ....................... | 370/389 |
| 2007/0053354 A1 * | 3/2007 | Rudolf et al. | ................. | 370/389 |
| 2007/0104162 A1 * | 5/2007 | Kneckt et al. | ................. | 370/338 |
| 2007/0110324 A1 | 5/2007 | Kwon et al. | .................. | 382/233 |
| 2007/0147284 A1 * | 6/2007 | Sammour et al. | ............ | 370/328 |
| 2007/0237120 A1 * | 10/2007 | Xu | ................................ | 370/338 |
| 2007/0240191 A1 * | 10/2007 | Singh et al. | ..................... | 725/81 |
| 2008/0250294 A1 * | 10/2008 | Ngo et al. | ...................... | 714/752 |
| 2009/0040970 A1 * | 2/2009 | Ahmadi et al. | ............... | 370/329 |
| 2009/0122767 A1 * | 5/2009 | Kwon et al. | .................. | 370/337 |
| 2010/0016023 A1 * | 1/2010 | Yamauchi et al. | ......... | 455/562.1 |

FOREIGN PATENT DOCUMENTS

| | | |
|---|---|---|
| KR | 10-2006-0107413 A | 10/2006 |
| KR | 10-2006-0131049 A | 12/2006 |
| KR | 10-2007-0051632 A | 5/2007 |

* cited by examiner

*Primary Examiner* — Chi H. Pham
*Assistant Examiner* — Shick Hom
(74) *Attorney, Agent, or Firm* — Sughrue Mion, PLLC

(57) ABSTRACT

Provided is a method and apparatus for generating a data frame. The method includes: generating a plurality of subframes by using at least one medium access control (MAC) service data unit (MSDU); generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and generating a data frame by using the subframes and the at least one of the UEP field, the MCS field, and the length field.

22 Claims, 9 Drawing Sheets

METHOD AND APPARATUS FOR GENERATING DATA FRAME

This application claims the benefits of U.S. Provisional Patent Application No. 60/973,233, filed on Sep. 18, 2007, in the U.S. Patent and Trademark Office, and Korean Patent Application No. 10-2008-0075347, filed on Jul. 31, 2008, in the Korean Intellectual Property Office, the disclosures of which are incorporated herein by reference.

The present invention relates to the field of wireless communications and particularly a method and apparatus for generating a data frame in a wireless network environment, including a Wireless Personal Area Network (WPAN) and other wireless network solutions.

The IEEE 802.15 working group (WG) has been organized to provide a communication standard for the personal operating space. The IEEE 802.15.3, which is one of four task groups (TGs) belonging to the IEEE 802.15 WG, has completed standardization of a high rate (HR)-WPAN used to transmit data at high speed.

According to an aspect of the present invention, there is provided a method of generating a data frame, the method comprising: generating a plurality of subframes by using at least one medium access control (MAC) service data unit (MSDU); generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and generating a data frame by using the subframes and the at least one of the UEP field, the MCS field, and the length field.

The method may further comprise generating a subframe header comprising the MCS field and the length field, wherein the generating of the data frame comprises generating a data frame by using the subframes and at least one of the UEP field and the subframe header.

The method may further comprise generating a physical (PHY) header comprising the subframe header and the UEP field, wherein the generating of the data frame comprises generating a data frame by using the PHY header, a MAC header, and the subframes.

The PHY header may further comprise at least one of an aggregation field indicating whether the subframes are aggregated and a subframe number field indicating the number of the subframes.

The generating of the data frame may comprise generating a data frame comprising a header group, which comprises a PHY header and a MAC header, and a payload, which comprises the subframes and the subframe header, wherein an MCS, which yields a data rate lower than that of an MCS applied to the payload, is applied to the header group.

The generating of the data frame may comprise generating a data frame comprising a header group, which comprises the subframe header, a PHY header, and a MAC header, and a payload, which comprises the subframes, wherein an MCS, which yields a data rate lower than that of an MCS applied to the payload, is applied to the header group.

The subframe header may further comprise at least one of an MSDU identification field comprising information for identifying an MSDU used to generate each of the subframes and a fragment information field indicating whether the subframes are fragmented.

The generating of the subframes may comprise generating, by using first type bits and second type bits which are extracted from each of the at least one MSDU, a subframe comprising only the first type bits and a subframe comprising only the second type bits.

The generating of the subframes may further comprise fragmenting each of the subframe comprising only the first type bits and the subframe comprising only the second type bits.

According to another aspect of the present invention, there is provided an apparatus for generating a data frame, the apparatus comprising: a subframe generating unit generating a plurality of subframes by using at least one MSDU; a field generating unit generating at least one field of an UEP field indicating whether UEP is applied to the subframes, an MCS field indicating a modulation and coding scheme applied to each of the subframes, and a length field indicating the length of each of the subframes; and a data frame generating unit generating a data frame by using the subframes and the at least one of the UEP field, the MCS field, and the length field.

The apparatus may further comprise a header generating unit generating a subframe header comprising the MCS field and the length field, wherein the data frame generating unit generates a data frame by using the subframes and at least one of the UEP field and the subframe header.

The header generating unit may generate a PHY header comprising the subframe header and the UEP field, wherein the data frame generating unit generates a data frame by using the PHY header, a MAC header, and the subframes.

According to another aspect of the present invention, there is provided a computer-readable recording medium having embodied thereon a program for executing a method, wherein the method comprises: generating a plurality of subframes by using at least one MSDU; generating at least one field of a UEP field indicating whether UEP is applied to the subframes, an MCS field indicating a modulation and coding scheme applied to each of the subframes, and a length field indicating the length of each of the subframes; and generating a data frame by using the subframes and the at least one of the UEP field, the MCS field, and the length field.

Figure 1:
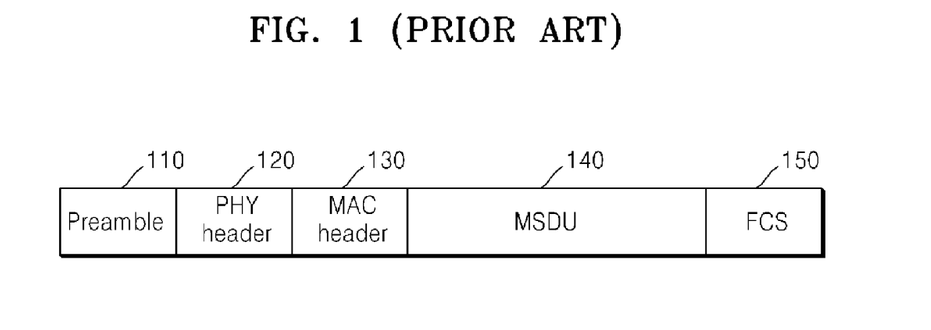
FIG. 1 illustrates an exemplary data frame used in a wireless personal area network (WPAN)

The above and other features and advantages of the present invention will become more apparent by describing in detail exemplary embodiments thereof with reference to the attached drawings in which:

FIG. 1 illustrates an exemplary data frame used in a WPAN. Referring to FIG. 1, a preamble 110 can be used to write a pattern for packet detection, symbol synchronization, frequency synchronization, etc.

A physical (PHY) header 120 is used to write information on the length of a frame body, the data rate of the frame body, etc., and is a header of a PHY layer. A medium access control (MAC) header 130 is used in a MAC layer.

A MAC service data unit (MSDU) 140 is data transmitted from an upper layer to the MAC layer, and is a payload of a MAC protocol data unit (MPDU) transmitted to the PHY layer by a service of the MAC layer.

A frame check sequence (FCS) 150 can be used to write cyclic redundancy check (CRC) code for allowing a reception side to detect a transmission error in a data frame.

Figure 2:
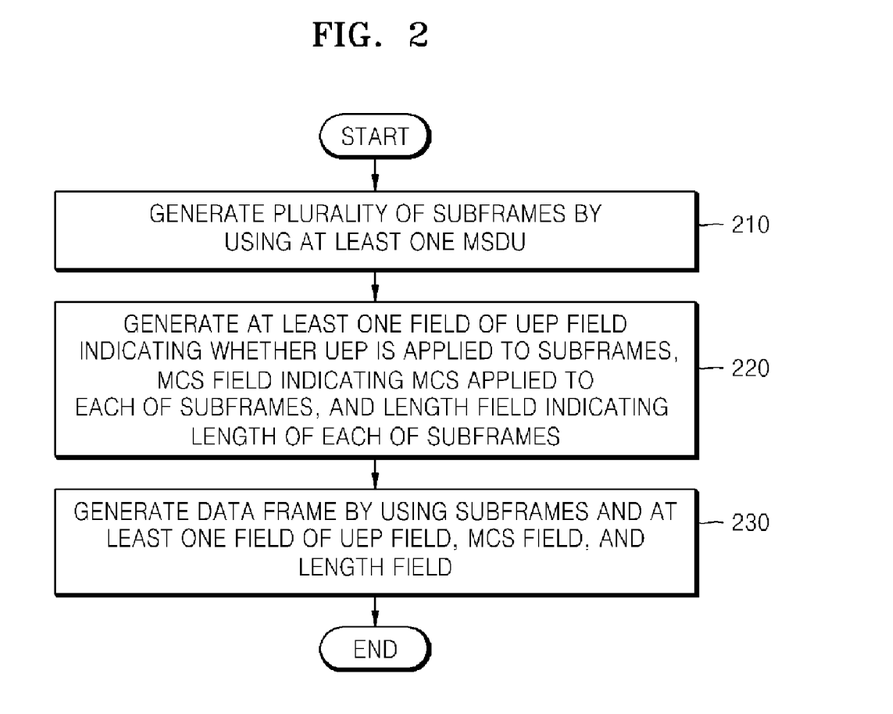
FIG. 2 is a flowchart illustrating a method of generating a data frame, according to an embodiment of the present invention.

FIG. 2 is a flowchart illustrating a method of generating a data frame, according to an embodiment of the present invention.

In operation 210, a plurality of subframes can be generated by using at least one medium access control (MAC) service data unit (MSDU).

The MSDU may include more significant bits (MSBs) and less significant bits (LSBs).

If the MSDU is data compressed by a compression algorithm, such as MPEG or JPEG, all bits may be of equal importance. However, if the MSDU is non-compressed data such as RGB data, information included in each bit may be of different importance. For example, upper 4 bits of 1 byte in the RGB data may have more important information than lower 4 bits thereof. Accordingly, the MSDU can contain the upper 4 bits as MSBs and the lower 4 bits as LSBs. The percentage of 1 byte, which occupied by MSBs may depend on the type of data and an embodiment thereof. In this regard, bits of 1 byte other than the MSBs may be all LSBs.

One MSDU may be divided into two subframes, that is, a subframe including only MSBs and a subframe including only LSBs.

The subframe including only the MSBs and the subframe including only the LSBs may be fragmented to generate a plurality of subframes.

The term 'subframe' can be identical and interchangeable with the term 'subpacket' in the drawings.

In operation 220, at least one field of an unequal error protection (UEP) field indicating whether UEP is applied to the subframes; a modulation and coding scheme (MCS) field indicating whether a modulation and coding scheme(s) are applied to each of the subframes; and a length field indicating the length of each of the subframes can be generated.

If the MCSs applied to the subframes are different from one another and the lengths of the subframes are different from one another, the MCS field and the length field may be generated for each of the subframes. However, if all the MCSs applied to the subframes are the same and all the lengths of the subframes are the same, one MCS field and one length field may be generated for all the subframes.

In operation 230, a data frame can be generated by using the subframes and the at least one field of the UEP field, the MCS field, and the length field.

Accordingly, since information about the MCSs applied to the subframes and information about the lengths of the subframes can be transmitted together with the subframes by using the MCS field and the length field, the data frame can be transmitted after varying the MCSs and the lengths of the subframes according to the type and importance of data included in the subframes.

Figure 3:
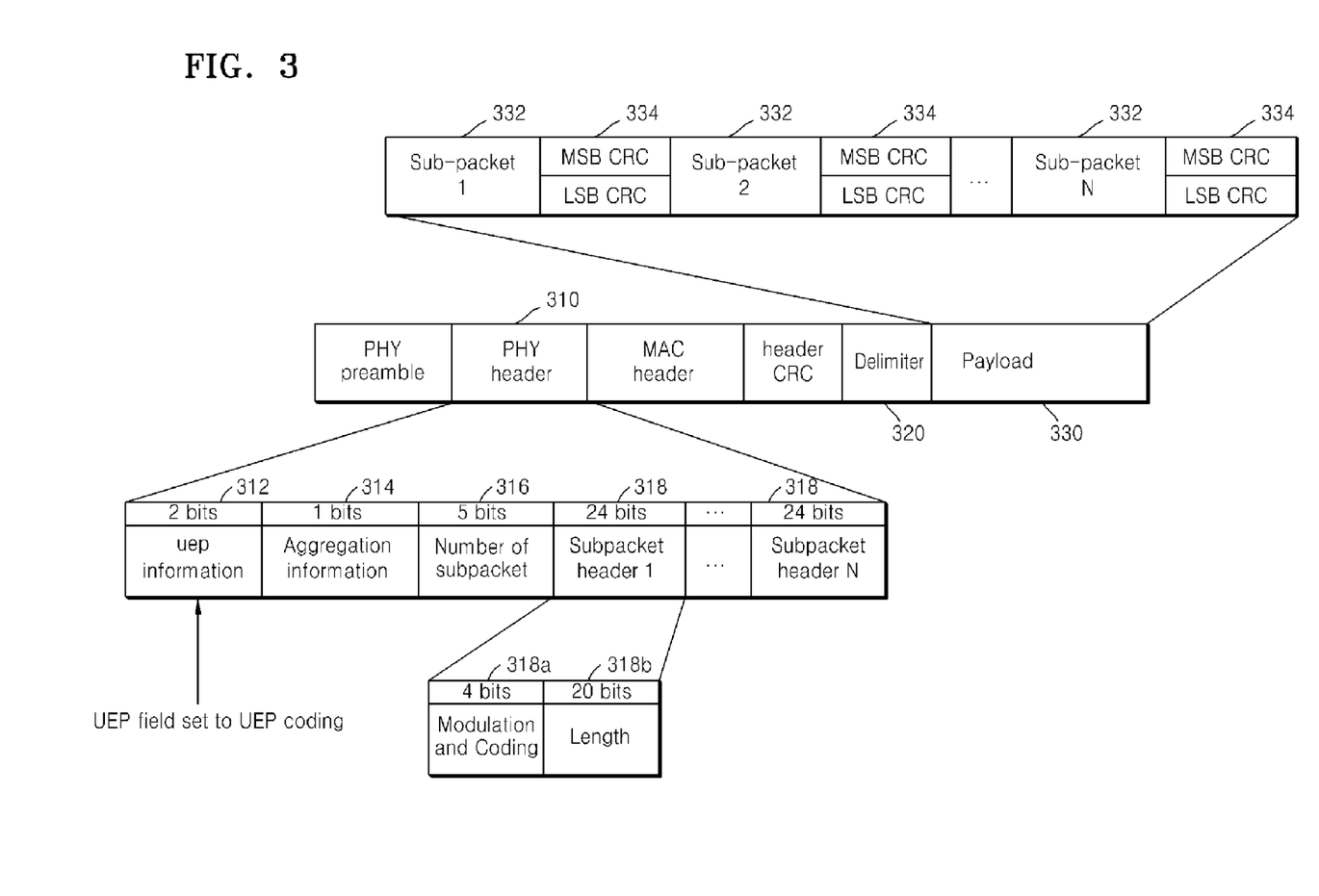
FIG. 3 illustrates a data frame according to an embodiment of the present invention.

FIG. 3 illustrates a data frame according to an embodiment of the present invention.

Referring to FIG. 3, the data frame may include a physical (PHY) header 310, a delimiter 320, and a payload 330.

The PHY header 310 can include a UEP field 312, an aggregation information field 314, a subpacket number field 316, and subpacket headers 318.

The UEP field 312 indicates whether UEP is applied to subpackets 332. FIG. 3 illustrates the UEP field 312 in which UEP is applied to the subpackets 332 by showing UEP field set to UEP coding.

The aggregation information field 314 may indicate whether the subpackets 332 are aggregated.

The subpacket number field 316 may indicate the number of the subpackets 332 including the payload 330.

The subpacket headers 318 can indicate information regarding the subpackets or subframes 332, and comprise N number of subpacket headers 318 respectively corresponding to the N subpackets 332. Each of the subpacket headers 318 may include an MCS field 318a and a length field 318b.

The MCS field 318a can indicate an MCS applied to each of the subpackets 332, and the length field 318b may indicate the length of each of the subpackets 332. In FIG. 3, the MCS field 318a and the length field 318b are included in each of the subpacket headers 318. Accordingly, since each of the subpacket headers 318 indicates the MCS and the length of each subpacket 332, a data frame can be generated by using the subpackets 332 having various lengths and MCSs.

The delimiter 320 may include information for indicating a boundary between the payload 330 and a header to distinguish one from the other.

The payload 330 can include subpackets 332 including MSBs and LSBs and cyclic redundancy checks 334 for detecting errors in the MSBs and the LSBs.

A PHY preamble 340, the PHY header 310, the MAC header 350, and a header CRC 360 may constitute a header group. An MCS yielding a data rate lower than that of an MCS applied to the payload 330 may be applied to the header group.

Other fields of the data frame of FIG. 3 are described in the IEEE 802.15.3C, and thus an explanation thereof will not be given here. Configuration and generation of the data frame according to an exemplary embodiment of the present invention can be implemented in a variety of manners, including the other wireless communications environment, without departing from the scope of the present invention.

Figure 4:
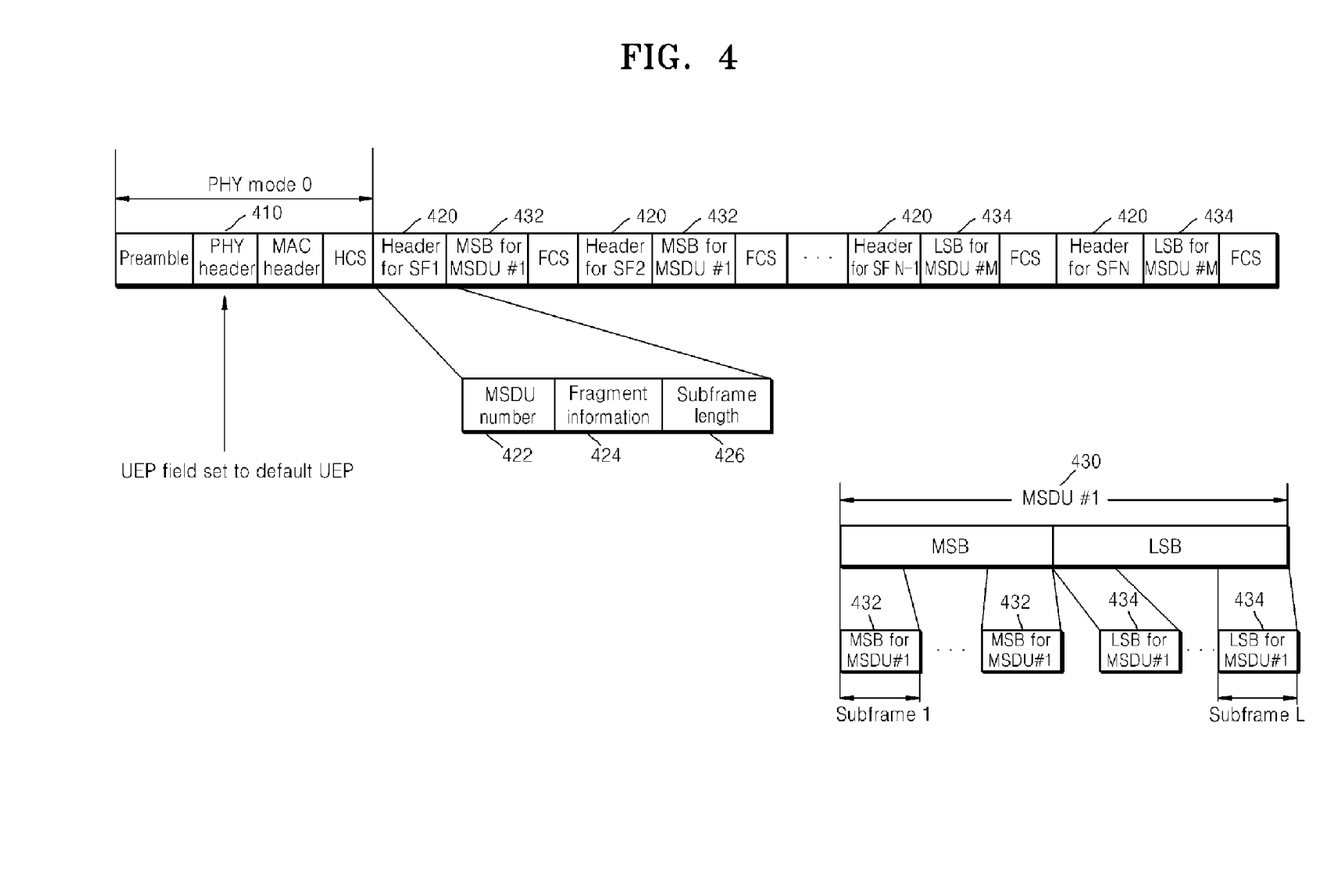
FIG. 4 illustrates a data frame according to another embodiment of the present invention.

FIG. 4 illustrates a data frame according to another embodiment of the present invention.

Referring to FIG. 4, the data frame may include a PHY header 410, subframe headers 420, subframes 432 for MSBs of MSDUs, and subframes 434 for LSBs of the MSDUs.

The PHY header 410 can include information indicating whether UEP is applied to subframes. In FIG. 4, the PHY header 410 indicates that UEP is applied to the subframes by showing UEP field set to default UEP.

Each of the subframe headers 420 may include an MSDU number field 422, a fragment information field 424, and a subframe length field 426.

The MSDU number field 422 can include a number of an MSDU, which has been used to generate each of the MSB or LSB for MSDU subframes 432 and 434, to ascertain which MSDU has been utilized to generate each subframe 432 and 434. In accordance with an exemplary embodiments of the present invention, if a certain subframe is generated by fragmentation from a first MSDU, 1 may be written as an MSDU number to the MSDU number field 422, and if a subframe is generated by being fragmented from a second MSDU, 2 may be written as an MSDU number to the MSDU number field 422. However, an MSDU identification field instead of the MSDU number field 422 may be included in the sub frame header 420, and in this case, an identifier for identifying an MSDU may be written to the MSDU identification field.

The fragment information field 424 may indicate whether the subframes are fragmented. FIG. 4 shows that the subframes are fragmented in accordance with an exemplary embodiment of the present invention.

In detail, the subframes 432 and 434 of FIG. 4 can be generated by dividing one MSDU 430 into a subframe including only MSBs and a subframe including only LSBs and fragmenting the subframe including only the MSBs and the subframe including only the LSBs.

If one MSDU is fragmented into L subframes and the number of MSDUs is M as shown in FIG. 4, the total number of generated subframes is N (=M×L).

However, subframes fragmented from at least one MSDU may not be included in the same data frame but may be included in different data frames. For example, if a total of N subframes are generated and M MSDUs exist, K subframes may be included in the same data frame and N-K subframes may be included in a next data frame.

Referring to FIG. 4, the subframe headers 420 may be positioned before the subframes 432 and 434 for MSB or LSB for MSDU, respectively, and frame check sequences (FCSs), which can detect errors in the subframe headers 420 and the subframes 432 and 434, can be positioned after the subframes 432 and 434, respectively.

The subframe length field 426 may indicate the length of each of the subframes.

The data frame of FIG. 4 can be different from that of FIG. 3 in that the subframe headers 420 may be included in a payload along with the subframes 432 and 434. Since the subframe headers 420 are included in the payload in FIG. 4, a MCS yielding the same data rate as that of an MCS applied to the subframes 432 and 434 may be applied to the subframe headers 420.

An MCS according to a PHY mode 0 which yields the lowest data rate may be applied to a preamble, the PHY header 410, a MAC header, and a HCS. Accordingly, the MCS applied to the preamble, the PHY header 410, the MAC header, and the HCS can yield a data rate lower than that of the MCS applied to the subframes 432 and 434 and the subframe headers 420. As a result, error probability in the preamble, the PHY header 410, and the MAC header can be lower than that in the subframe headers 420 and the subframes 432 and 434.

Other fields of the data frame of FIG. 4 are described in the IEEE 802.15.3C, and thus an explanation thereof will not be given here. Configuration and generation of the data frame according to an exemplary embodiment of the present invention can be implemented in a variety of manners, including the other wireless communications environment, without departing from the scope of the present invention.

Figure 5:
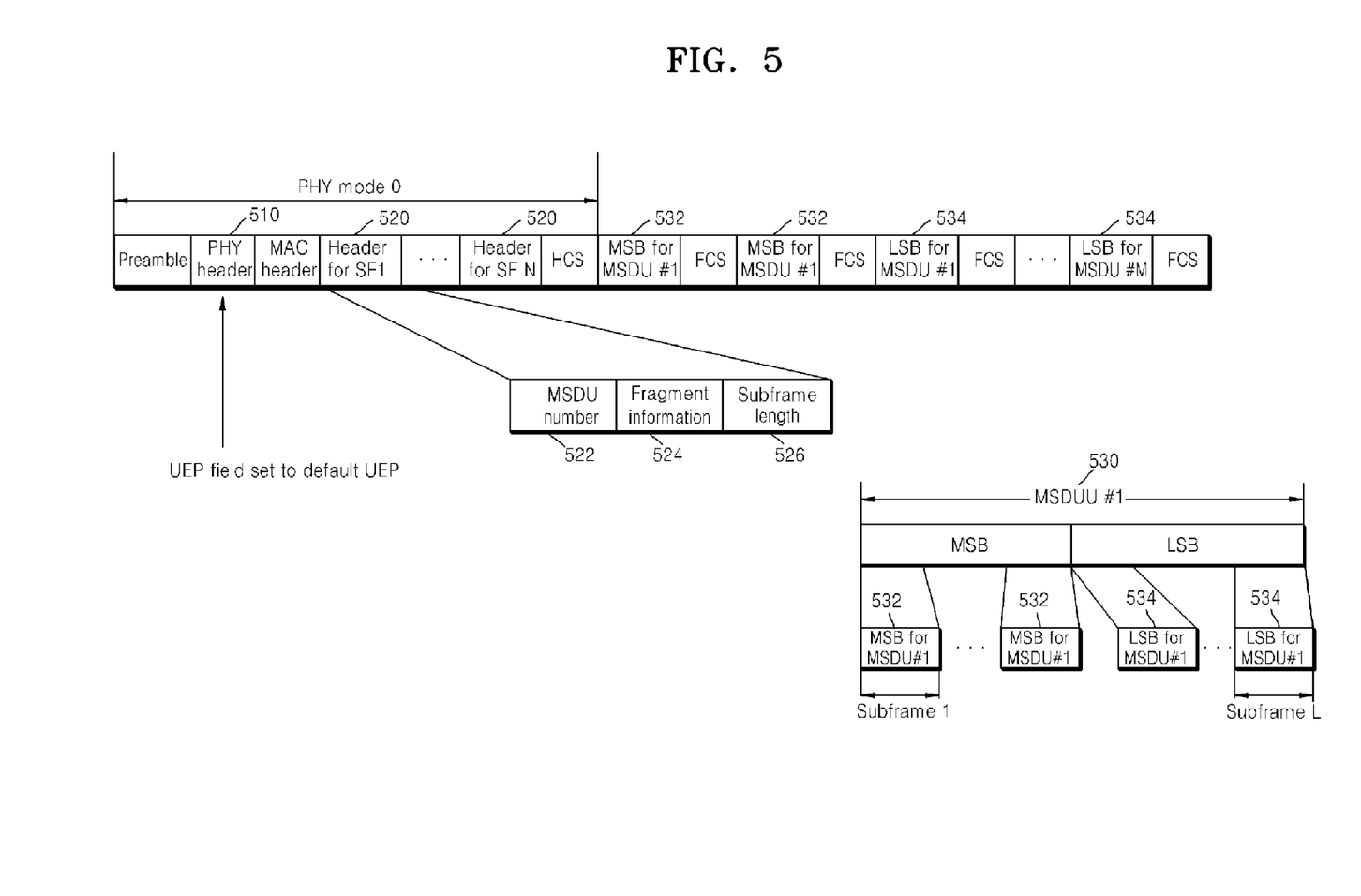
FIG. 5 illustrates a data frame according to another embodiment of the present invention.

FIG. 5 illustrates a data frame according to another embodiment of the present invention.

Referring to FIG. 5, the data frame includes a PHY header 510, subframe headers 520, subframes 532 for MSBs of MSDUs, and subframes 534 for LSBs of the MSDUs.

Although the data frame of FIG. 5 may be identical to the data frame of FIG. 4 in that the subframes 532 and 534 are fragmented, the data frame of FIG. 5 can be different from the data frame of FIG. 4 in that the subframe headers 520 are not included in a payload but are included in a header group including the PHY header 510 and a MAC header.

In FIG. 5, the PHY header 510 indicates that UEP is applied to the subframes. According to an exemplary embodiment, UEP field can be set to default UEP in FIG. 5.

Accordingly, an MCS according to the PHY mode 0 yielding the lowest data rate may be applied to the subframe headers 520 in FIG. 5.

Except for the above-described difference, the data frame of FIG. 5 may be identical to the data frame of FIG. 4, and thus a further explanation thereof will not be given here.

Figure 6:
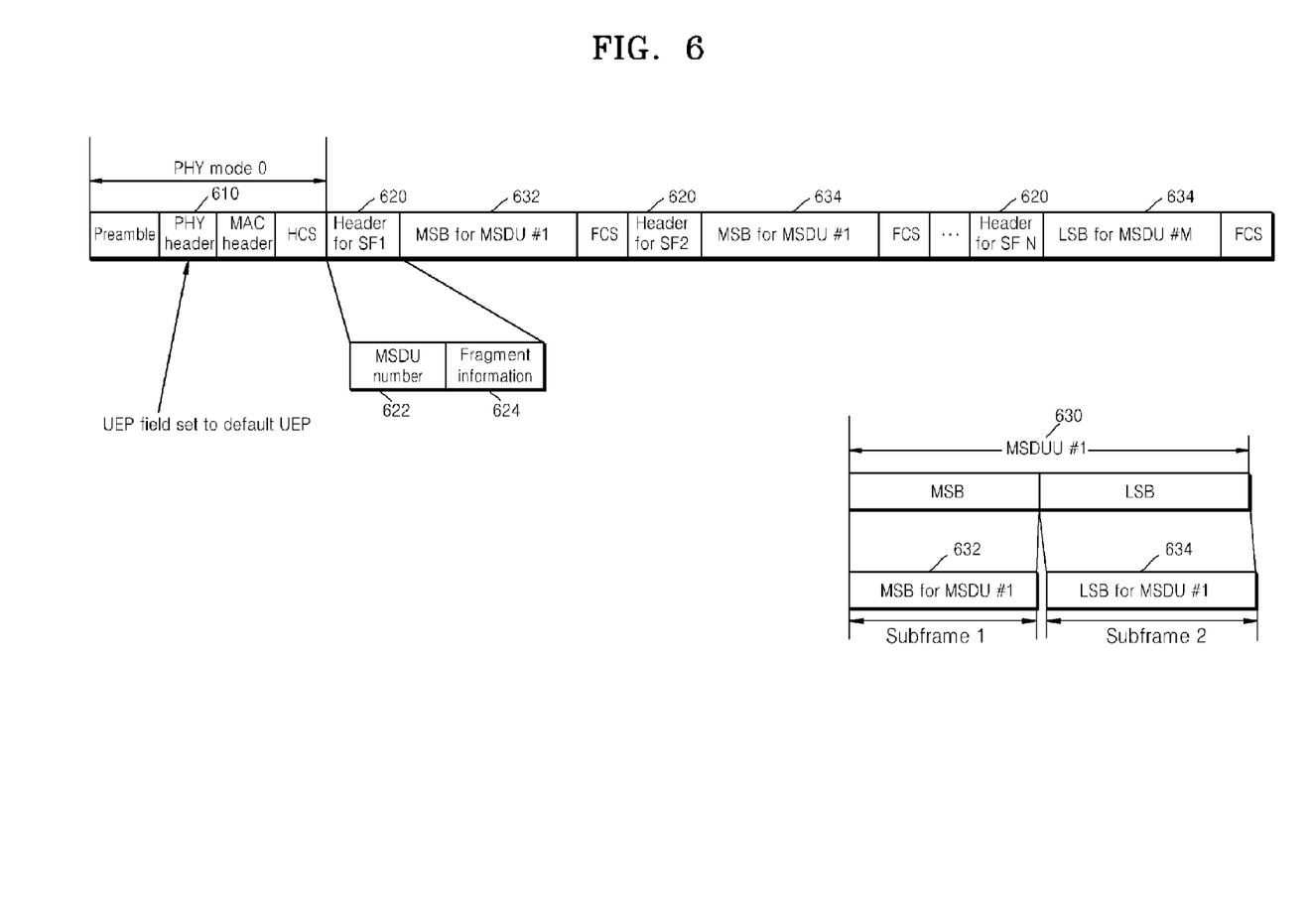
FIG. 6 illustrates a data frame according to another embodiment of the present invention.

FIG. 6 illustrates a data frame according to another embodiment of the present invention.

Referring to FIG. 6, the data frame may include a PHY header 610, subframe headers 620, subframes 632 for MSBs of MSDUs, and subframes 634 for LSBs of the MSDUs.

In FIG. 6, the PHY header 610 indicates that UEP is applied to the subframes. According to an exemplary embodiment, UEP field can be set to default UEP in FIG. 6.

Although the data frame of FIG. 6 may be identical to the data frame of FIG. 4 in that the subframe headers 620 are included in a payload, the data frame of FIG. 6 can be different from the data frame of FIG. 4 in that the subframes 632 and 634 are not fragmented.

That is, in FIG. 6, one MSDU 630 can be divided into a subframe 632 including only MSBs and a subframe 634 including only LSBs, and each of the subframes 632 and 634 is not fragmented.

Also, in FIG. 6, each of the subframe headers 620 may include an MSDU number field 622 and a fragment information field 624. Each of the subframe headers 620 may further include a length field (not shown in the drawing) indicating the length of each of the subframes 632 and 634.

Except for the above-described difference, the data frame of FIG. 6 is the same as the data frame of FIG. 4, and thus a further explanation thereof will not be given here.

Figure 7:
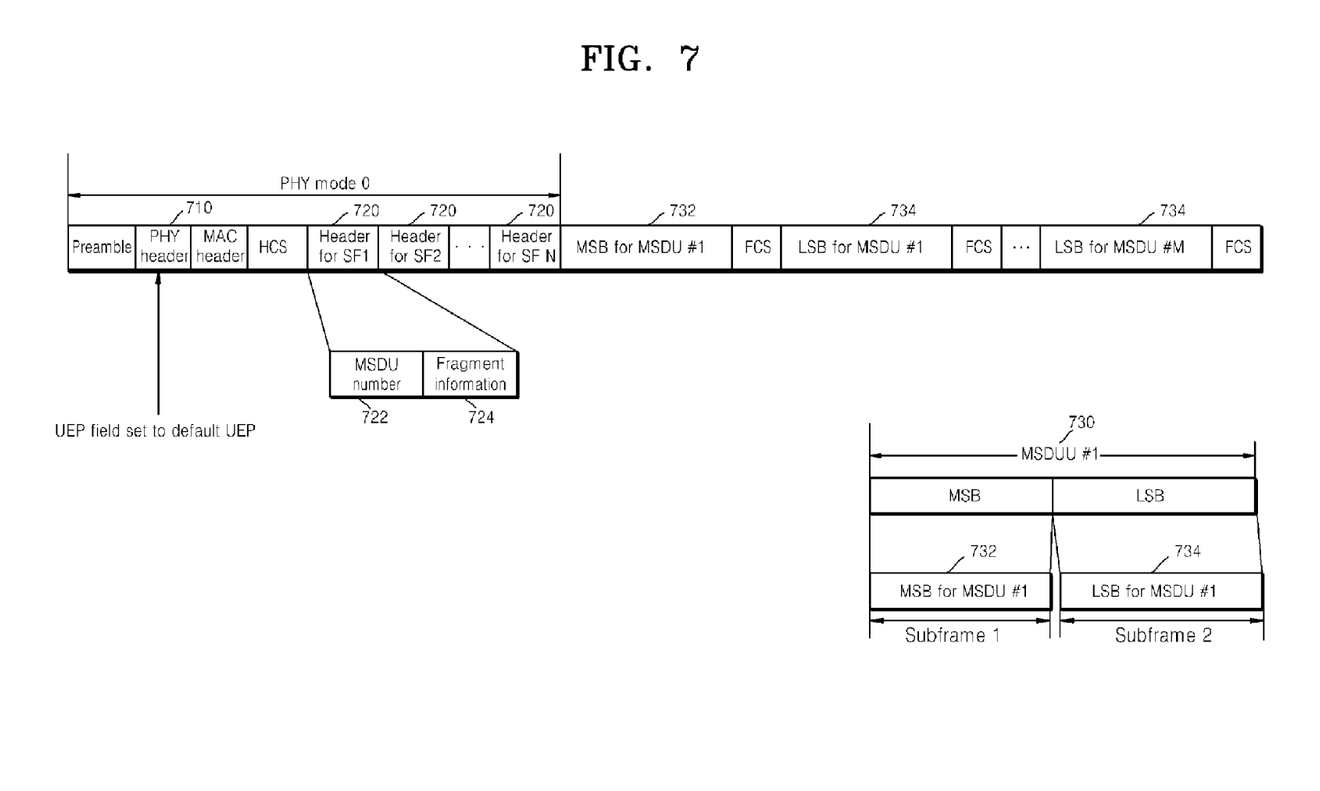
FIG. 7 illustrates a data frame according to another embodiment of the present invention.

FIG. 7 illustrates a data frame according to another embodiment of the present invention.

Referring to FIG. 7, the data frame may include a PHY header 710, subframe headers 720, subframes 732 for MSBs of MSDUs, and subframes 734 for LSBs of the MSDUs.

Although the data frame of FIG. 7 may be identical to the data frame of FIG. 5 in that the subframe headers 720 are not included in a payload but are included in a header group including the PHY header 710 and a MAC header, the data frame of FIG. 7 can be different from the data frame of FIG. 5 in that the subframes 732 and 734 are not fragmented.

Also, in FIG. 7, each of the subframe headers 720 can include an MSDU number field 722 and a fragment information field 724. Each of the subframe headers 720 may further include a length indicating the length of each of the subframes 732 and 734.

Except for the above-described difference, the data frame of FIG. 7 may be identical to the data frame of FIG. 5, including the UEP field and MSDU 730 related matters, and thus a further explanation thereof will not be given here.

Figure 8:
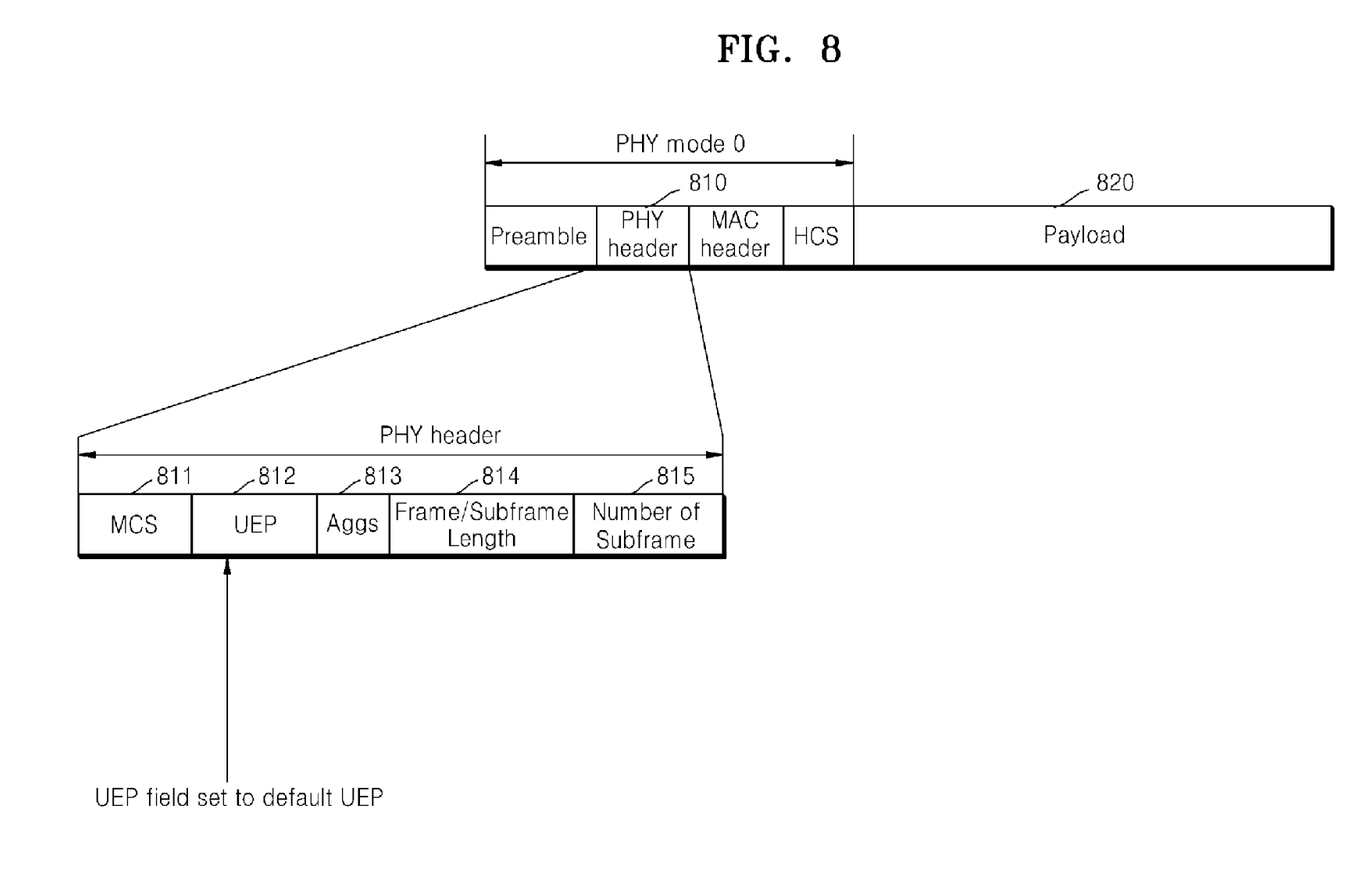
FIG. 8 illustrates a data frame according to another embodiment of the present invention.

FIG. 8 illustrates a data frame according to another embodiment of the present invention.

Referring to FIG. 8, a PHY header 810 can include an MCS field 811, an UEP field 812 (including UEP field set to default UEP), an aggregation information field 813, a length field 814, and a subframe number field 815.

In FIG. 8, the MCS field 811 and the length field 814 may not be generated to respectively correspond to subframes included in a payload 820, but only one MCS field 811 and one length field 814 can be generated. Accordingly, all the subframes have the same MCS and the same length.

Figure 9:
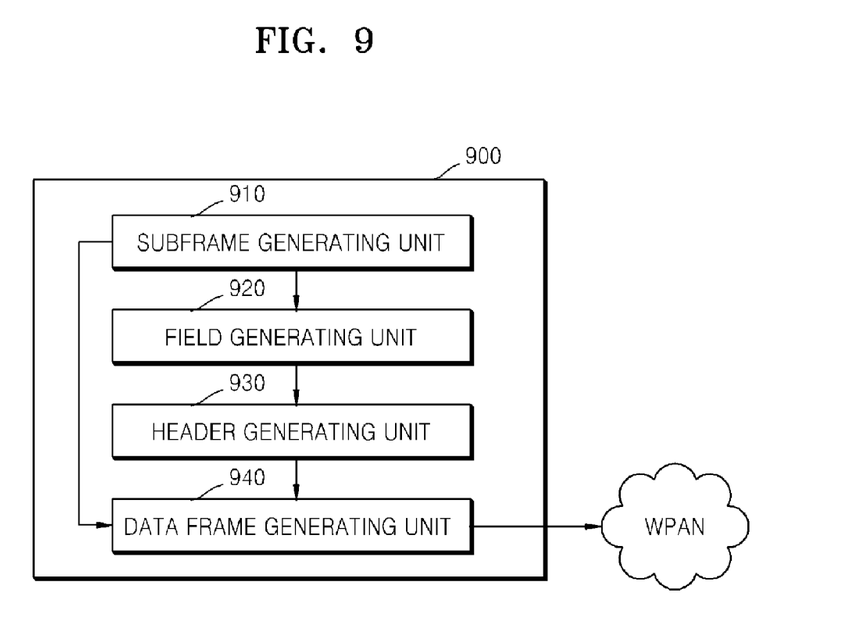
FIG. 9 is a block diagram of an apparatus for generating a data frame, according to an embodiment of the present invention.

FIG. 9 is a block diagram of an apparatus 900 for generating a data frame, according to an embodiment of the present invention.

Referring to FIG. 9, the apparatus 900 may include a subframe generating unit 910, a field generating unit 920, a header generating unit 930, and a data frame generating unit 940.

The subframe generating unit 910 can generate a plurality of subframes by using at least one MSDU.

The field generating unit 920 may generate at least one field of a UEP field indicating whether UEP is applied to the subframes, an MCS field indicating an MCS applied to each of the subframes, and a length field indicating the length of each of the subframes.

The header generating unit 930 may generate a subframe header including the MCS field and the length field. Alternatively, the header generating unit 930 may generate a PHY header including the sub frame header and the UEP field.

The data frame generating unit 930 can generate a data frame by using the subframe header and the subframes. Alternatively, the data frame generating unit 930 may generate a data frame by using the PHY header and the subframes.

When the apparatus 900 generates a data frame and is in communication with WPAN or other types of wireless network, the capability of a receiving device for receiving the data frame should be considered. In order to determine the capability of the receiving device, the apparatus 900 may receive a capability information frame including information about the capability of the receiving device.

Figure 10:
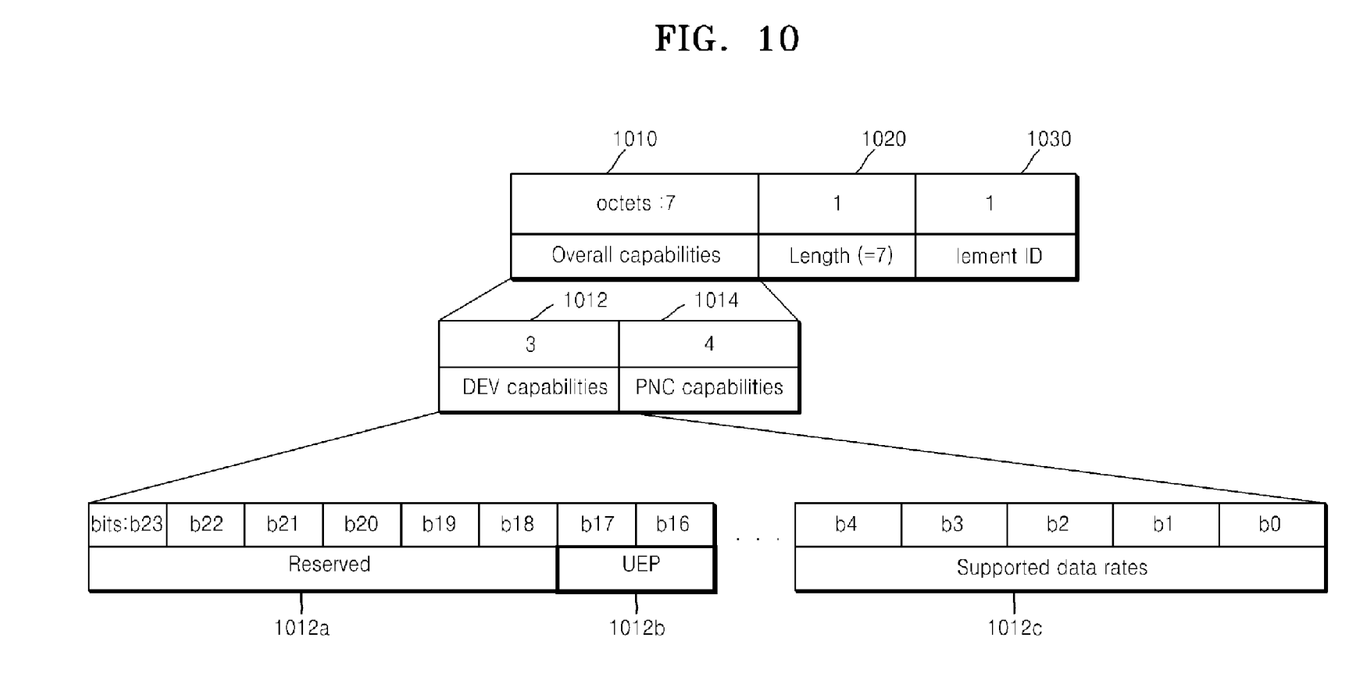
FIG. 10 illustrates a capability information frame according to an embodiment of the present invention.

FIG. 10 illustrates a capability information frame according to an embodiment of the present invention.

Referring to FIG. 10, the capability information frame can include an overall capability field 1010, a length field 1020, and a capability identification (ID) field 1030.

The overall capability field 1010 can include a device capability field 1012 and a piconet coordinator (PNC) capability field 1014.

The device capability field 1012 can indicate the capability of a receiving device for receiving a data frame, and include a reserved field 1012a, a UEP field 1012b, and an MCS supported data rate field 1012c.

The reserved field 1012a may be reserved for the other use which is not defined yet.

The UEP field 1012b can indicate whether the receiving device has a capability to decode UEP-coded subframes.

The MCS supported data rate field 1012c indicates the data rate of an MCS that is supported by the receiving device to decode the subframes.

The PNC capability field 1014 may indicate whether the receiving device has a capability to act as a piconet coordinator.

The length field 1020 may indicate the length of the capability information frame.

The capability information ID field 1030 can indicate an ID for identifying the capability information frame.

The apparatus 900 can receive the capability information frame from the receiving device, and then generate a data frame by considering the capability of the receiving device.

The present invention can be compatible with technologies such as 802.11x and 802.15.3.

The present invention may be embodied in a general purpose digital computer by running a program from a computer-readable recording medium. Examples of the computer-readable recording medium include storage media such as magnetic storage media (e.g., read only memories (ROMs), floppy discs, or hard discs), optically readable media (e.g., compact disk-read only memories (CD-ROMs), or digital versatile disks (DVDs)) and other types of storage media.

Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio files. Therefore, the scope of the invention is defined not by the detailed description of the invention but by the appended claims, and all differences within the scope will be construed as being included in the present invention.

What is claimed is:

1. A method of generating a data frame, the method comprising:
   generating a plurality of subframes by using at least one medium access control (MAC) service data unit (MSDU);
   generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and
   generating the data frame by using the subframes and the at least one of the UEP field, the MCS field, and the length field,
   wherein the generated plurality of subframes comprises at least two subframes generated from one MSDU.

2. The method of claim 1, further comprising:
   generating a subframe header comprising the MCS field and the length field,
   wherein the data frame comprises at least one of the UEP field and the subframe header.

3. The method of claim 2, further comprising generating a physical (PHY) header comprising the subframe header and the UEP field,
   wherein the data frame comprises the PHY header, a MAC header, and the subframes.

4. The method of claim 3, wherein the PHY header further comprises at least one of an aggregation field indicating whether the subframes are aggregated and a subframe number field indicating the number of the subframes.

5. A method of generating a data frame, the method comprising:
   generating a plurality of subframes by using at least one medium access control (MAC) service data unit (MSDU);
   generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes;
   generating the data frame by using the subframes and the at least one of the UEP field, the MCS field, and the length field; and generating a subframe header comprising the MCS field and the length field, wherein the data frame comprises at least one of the UEP field and the subframe header, wherein the generating of the data frame comprises generating the data frame comprising a header group, which comprises a PHY header and a MAC header, and a payload, which comprises the subframes and the subframe header, wherein an MCS applied to the header group yields a data rate lower than that of an MCS applied to the payload.

6. A method of generating a data frame, the method comprising:

generating a plurality of subframes by using at least one medium access control (MAC) service data unit (MSDU);

generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes;

generating the data frame by using the subframes and the at least one of the UEP field, the MCS field, and the length field; and generating a subframe header comprising the MCS field and the length field, wherein the data frame comprises at least one of the UEP field and the subframe header, wherein the generating of the data frame comprises:

generating the data frame comprising a header group, which comprises the subframe header, a PHY header, and a MAC header, and a payload, which comprises the subframes, wherein an MCS applied to the header group yields a data rate lower than that of an MCS applied to the payload.

7. The method of claim 2, wherein the subframe header further comprises at least one of an MSDU identification field comprising information for identifying an MSDU used to generate each of the subframes and a fragment information field indicating whether the subframes are fragmented.

8. A method of generating a data frame, the method comprising:

generating a plurality of subframes by using at least one medium access control (MAC) service data unit (MSDU);

generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and generating the data frame by using the subframes and the at least one of the UEP field, the MCS field, and the length field, wherein the generating of the subframes comprises generating, by using first type bits and second type bits which are extracted from each of the at least one MSDU, a first subframe of the plurality of subframes having the first type bits and a second subframe of the plurality of subframes having the second type bits.

9. The method of claim 8, wherein the generating of the subframes further comprises fragmenting each of the first subframe having the first type bits and the second subframe having the second type bits.

10. An apparatus for generating a data frame, the apparatus comprising:

a subframe generating unit generating a plurality of subframes by using at least one medium access control (MAC) service data unit (MSDU);

a field generating unit generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and a data frame generating unit generating the data frame by using the subframes and the at least one of the UEP field, the MCS field, and the length field, wherein the generated plurality of subframes comprises at least two subframes generated from one MSDU.

11. The apparatus of claim 10, further comprising:

a header generating unit generating a subframe header including the MCS field and the length field, wherein the data frame generating unit generates the data frame by using the subframes and at least one of the UEP field and the subframe header.

12. The apparatus of claim 11, wherein the header generating unit generates a physical (PHY) header comprising the subframe header and the UEP field, and wherein the data frame generating unit generates the data frame by using the PHY header, a MAC header, and the subframes.

13. The apparatus of claim 12, wherein the PHY header further comprises at least one of an aggregation information field indicating whether the subframes are aggregated, and a subframe number field indicating the number of the subframes.

14. An apparatus for generating a data frame, the apparatus comprising:

a subframe generating unit generating a plurality of subframes by using at least one medium access control (MAC) service data unit (MSDU);

a field generating unit generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes;

a data frame generating unit generating the data frame by using the subframes and the at least one of the UEP field, the MCS field, and the length field; and a header generating unit generating a subframe header including the MCS field and the length field, wherein the data frame generating unit generates the data frame by using the subframes and at least one of the UEP field and the subframe header, wherein the data frame generating unit generates the data frame comprising a header group, which comprises a PHY header and a MAC header, and a payload, which comprises the subframes and the subframe header, wherein an MCS, which yields a data rate lower than that of an MCS applied to the payload, is applied to the header group.

15. An apparatus for generating a data frame, the apparatus comprising:

a subframe generating unit generating a plurality of subframes by using at least one medium access control (MAC) service data unit (MSDU);

a field generating unit generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes;

a data frame generating unit generating the data frame by using the subframes and the at least one of the UEP field, the MCS field, and the length field; and a header generating unit generating a subframe header including the MCS field and the length field, wherein the data frame generating unit generates the data frame by using the subframes and at least one of the UEP field and the subframe header, wherein the data frame generating unit generates the data frame comprising a header group, which comprises the subframe header, a PHY header, and a MAC header, and a payload, which comprises the subframes, wherein an MCS applied to the header group yields a data rate lower than that of an MCS applied to the payload.

16. The apparatus of claim 11, wherein the subframe header further comprises at least one of an MSDU identification field comprising information for identifying an MSDU used to generate each of the subframes and a fragment information field indicating whether the subframes are fragmented.

17. An apparatus for generating a data frame, the apparatus comprising:
 a subframe generating unit generating a plurality of subframes by using at least one medium access control (MAC) service data unit (MSDU);
 a field generating unit generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and
 a data frame generating unit generating the data frame by using the subframes and the at least one of the UEP field, the MCS field, and the length field,
 wherein the subframe generating unit generates, by using first type bits and second type bits which are extracted from each of the at least one MSDU, a first subframe of the plurality of subframes comprising only the first type bits and a second subframe of the plurality of subframes comprising only the second type bits.

18. The apparatus of claim 17, wherein the subframe generating unit generates the plurality of subframes by fragmenting each of the first subframe comprising only the first type bits and the second subframe comprising only the second type bits.

19. An apparatus for generating a data frame, the apparatus comprising:
 a subframe generating unit generating a plurality of subframes by using at least one medium access control (MAC) service data unit (MSDU);
 a field generating unit generating at least one field of an unequal error protection (UEP) field indicating whether UEP is applied to the subframes, a modulation and coding scheme (MCS) field indicating a modulation and coding scheme applied to each of the subframes, and a length field indicating the length of each of the subframes; and
 a data frame generating unit generating the data frame by using the subframes and the at least one of the UEP field, the MCS field, and the length field,
 wherein the apparatus is in communication with a second apparatus and receives data regarding a capability of the second apparatus.

20. The apparatus of claim 19, wherein the received data regarding a capability of the second apparatus comprises a capability information frame including an overall capability field, a length field, and a capability identification field.

21. The apparatus of claim 20, wherein the apparatus generates the data frame by ascertaining the capability information frame received from the second apparatus.

22. A non-transitory computer-readable recording medium having embodied thereon a program for executing the method of claim 1.

\* \* \* \* \*